Dec. 14, 1926.

T. BROWN ET AL

PLOW

Original Filed July 3, 1920   4 Sheets-Sheet 1

1,610,253

Witness:
Erick F. Erickson

Inventors:
Theophilus Brown
Carl G. Strandlund
by J. H. Bliss
Attorney.

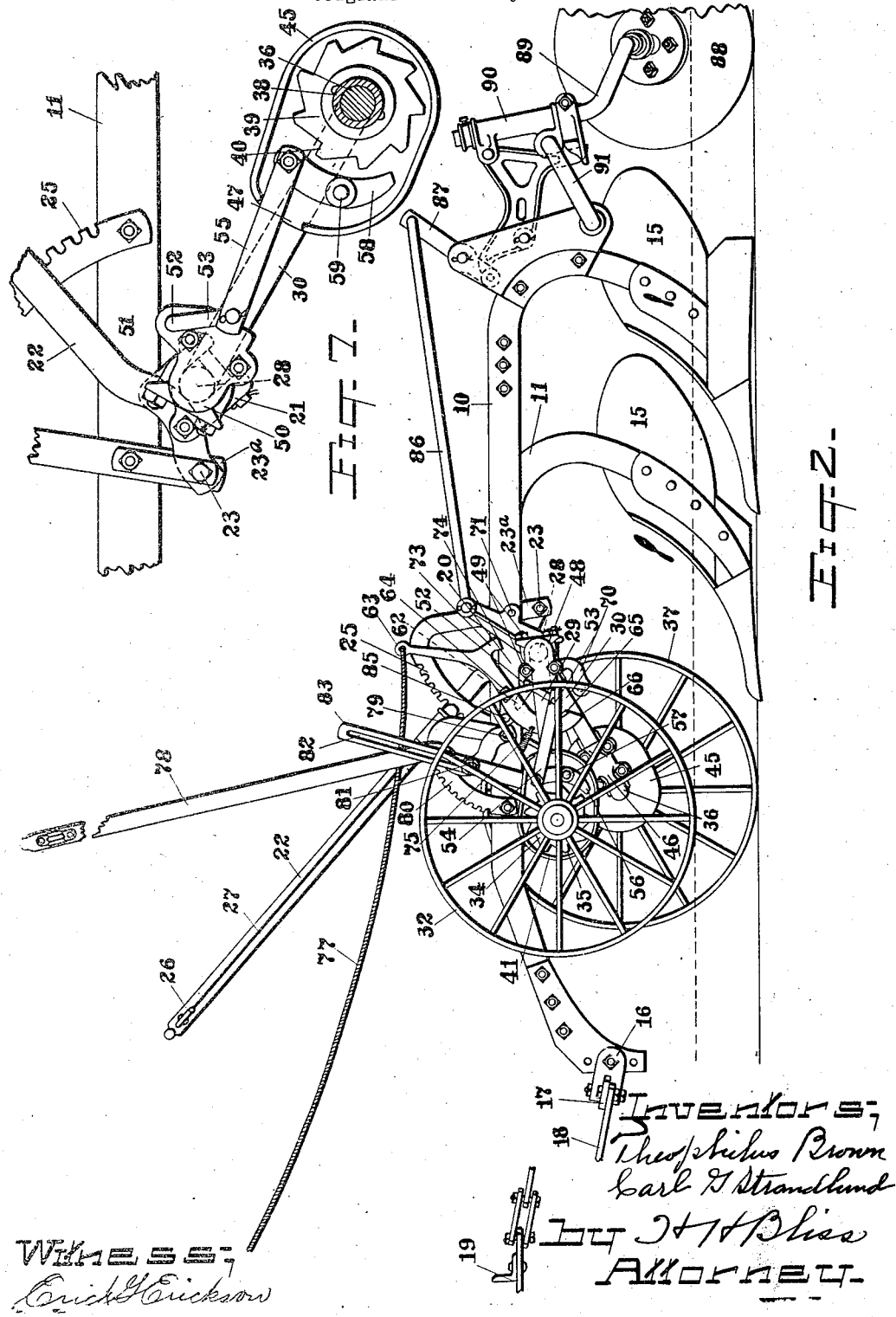

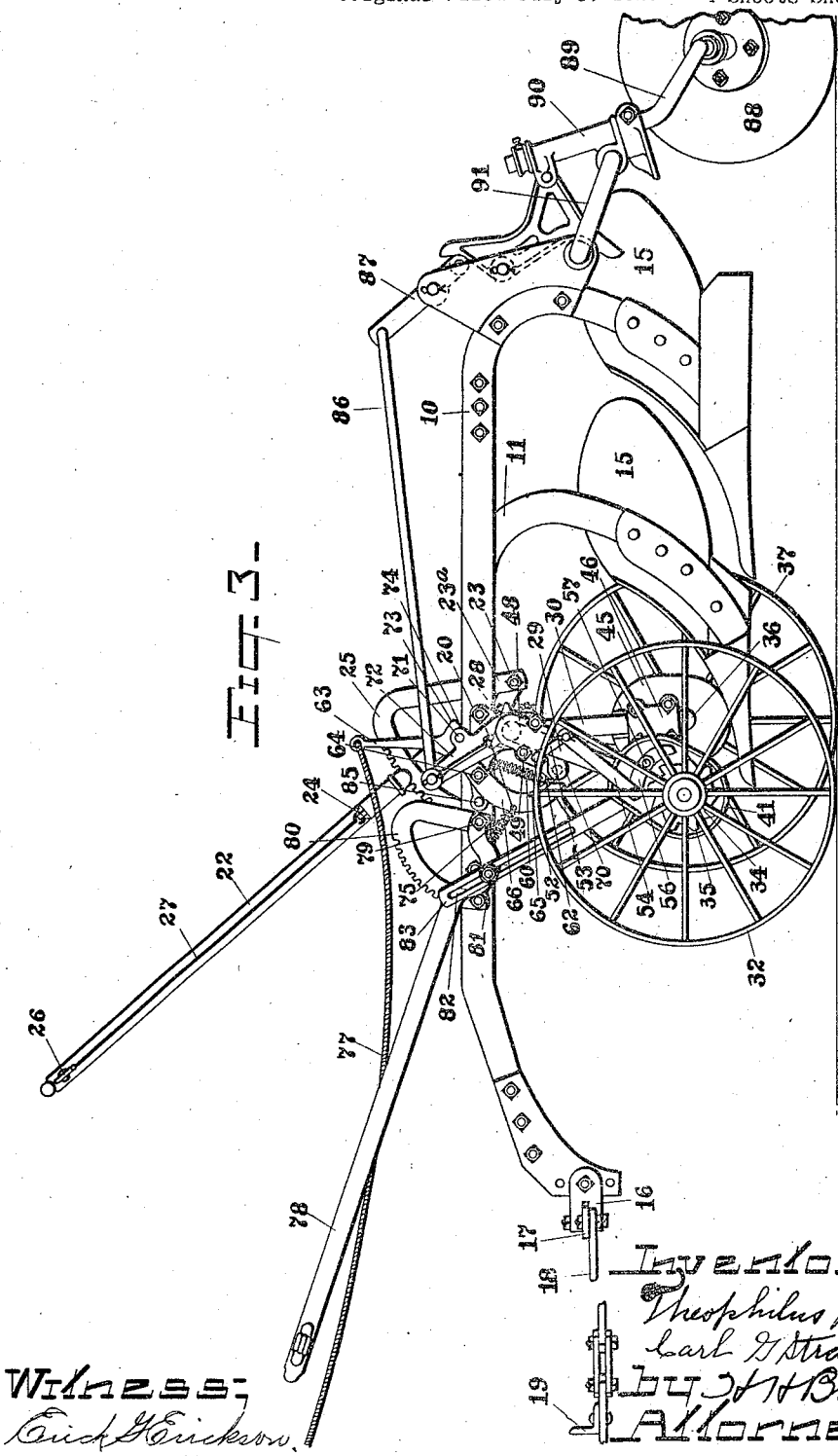

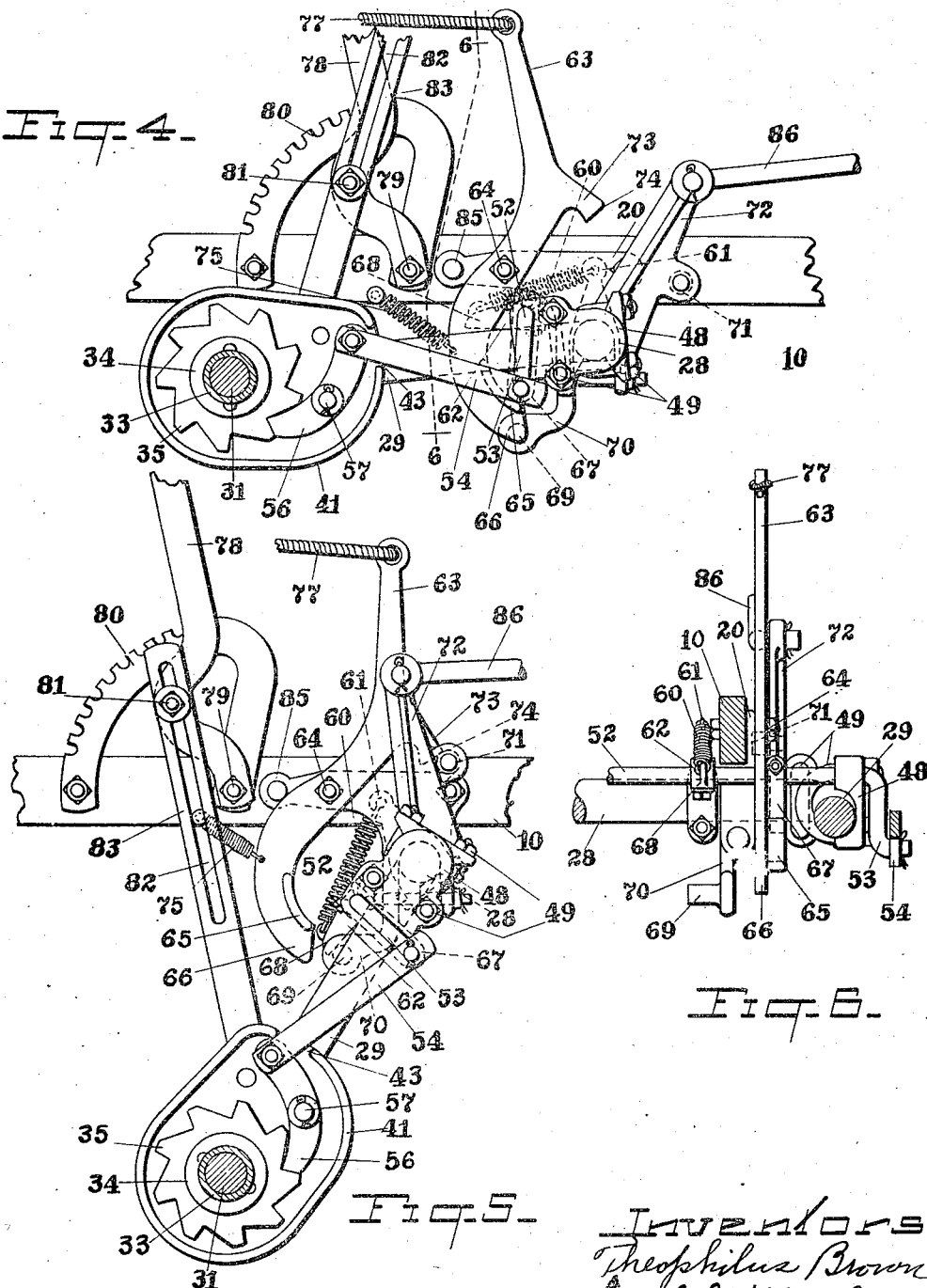

Patented Dec. 14, 1926.

1,610,253

UNITED STATES PATENT OFFICE.

THEOPHILUS BROWN AND CARL G. STRANDLUND, OF MOLINE, ILLINOIS, ASSIGNORS TO DEERE & COMPANY, OF MOLINE, ILLINOIS, A CORPORATION OF ILLINOIS.

PLOW.

Application filed July 3, 1920, Serial No. 393,823. Renewed April 24, 1925.

The invention relates to self-lift wheel plows, and it is the object of the invention to improve the means for moving the plow beams and the plow bodies, secured to the beams, into and out of plowing position.

In the accompanying drawings illustrating the invention and in which like numerals of reference in the several views indicate corresponding parts:

Figure 2 is a side elevation of the plow in lowered plowing position.

Figure 3 is a side elevation of the plow in raised position.

Figure 4 is a detail of the wheel system as viewed from the landward side, the wheels being locked preparatory for the lifting operation.

Figure 5 is a detail similar to Figure 4 but with the plow approaching the point where the wheels will be automatically unlocked.

Figure 6 is a transverse vertical section on the line 6—6 of Figure 4.

Figure 7 is a detail of the wheel system as viewed from the furrowward side, the parts being in the same relative position as shown in Figure 4.

Figure 1:
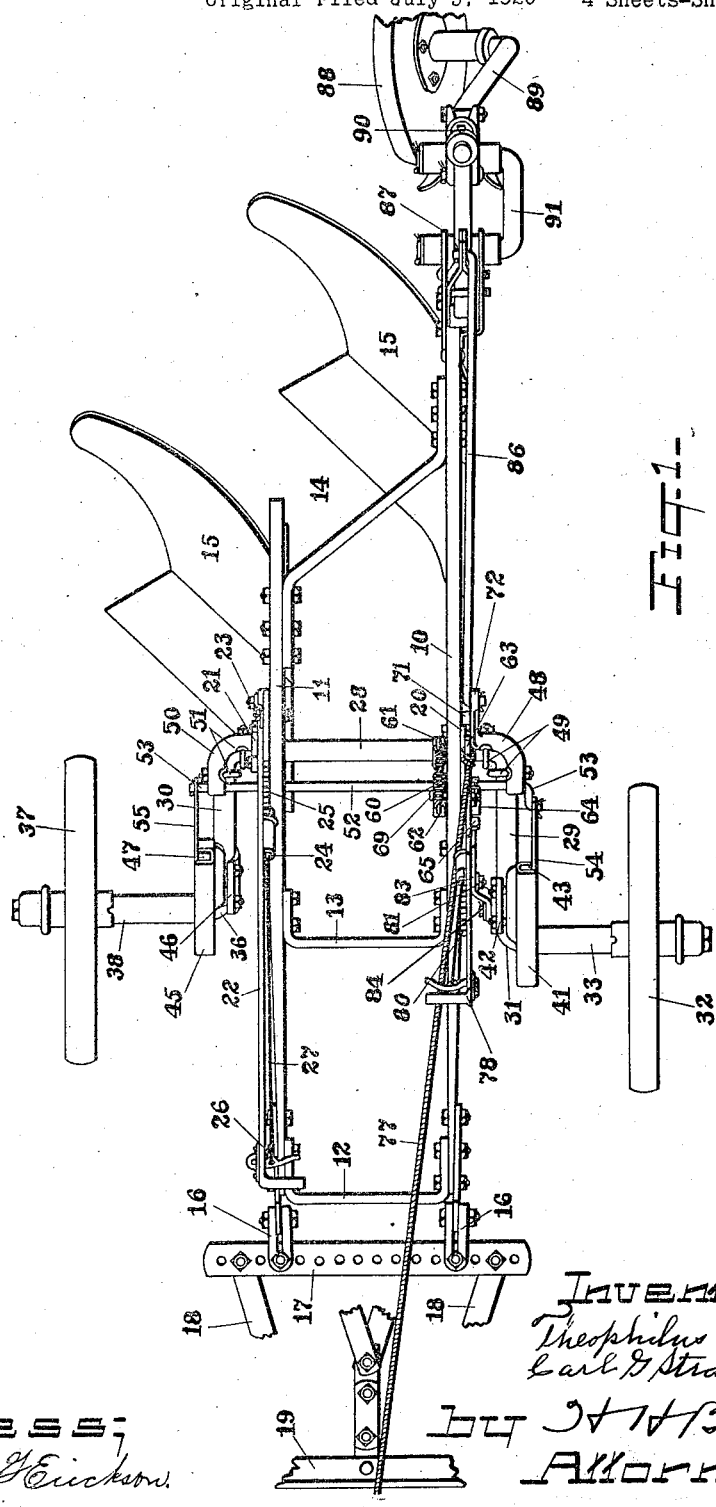
Figure 1 is a plan view of the improved plow.

Referring to the drawings, the plow frame is composed of spaced plow beams 10—11 and transverse brace members 12—13—14 bolted or otherwise rigidly secured to the beams. A plow body 15 of a well known type is secured to the downwardly extending rear portion of each plow beam.

A clevis 16 is connected with the forward end of each beam, and connected to the clevises is a transverse bar 17 from which extend draft bars 18 for attachment to a draw bar 19 which may be part of a tractor or may be animal drawn.

20 indicates a bearing secured to the landward beam 10, and 21 a bearing secured to a lever 22, the latter being pivotally supported at 23 upon a member 23ª depending from the beam 11. The lever 22 is normally held rigid with the beam 11 by a plunger dog 24 which is carried by the lever and engages a toothed rack 25 secured to the beam 11. The lever is provided with a hand latch 26 and operating rod 27 for releasing the dog 24 from the rack 25 when it is desired to swing the bearing 21 about the pivot 23 for the purpose of leveling the plow as hereinafter mentioned.

Rockably journaled in the bearings 20—21 is a crank or arched axle having a horizontal portion 28 and downwardly extending portions or side members 29 and 30. The portion 29 terminates in a spindle 31 upon which is journaled a landwheel 32, the hub of the latter having an inwardly extending sleeve 33 to which is secured a wheel 34 having ratchet-like teeth 35. The portion 30 terminates in a spindle 36 upon which is journaled a furrowwheel 37, the hub of the latter having an inwardly extending sleeve 38 to which is secured a wheel 39 having ratchet-like teeth 40. A housing 41 is secured to the axle portion 29 at the inner end of the wheel spindle 31, by a clamp member 42 and suitable clamp bolts; the housing is open at the top as indicated at 43 but otherwise extends over the inner portion of the wheel 34 and protects the teeth thereof from engaging weeds or trash. The housing 41 also serves as a support and enclosure for a wheel locking device that will later be more specifically referred to. A similar housing 45 is secured to the axle portion 30 by a clamp member 46 and suitable clamp bolts; the housing 45, while open at the top as indicated at 49, protects the teeth of the wheel 39 and serves as a support and enclosure for a wheel locking device that will later be more specifically referred to.

A bracket member 48 is attached to the axle 28 and the portion 29 thereof by clamp bolts 49, and a similar bracket 50 is attached to the axle 28 and the portion 30 thereof by clamp bolts 51. Rockably mounted in suitable bearings in the brackets 48 and 50 is a transverse rock shaft 52 the ends of which are cranked as indicated at 53, a link 54 being pivotally connected with the landward crank and a similar link 55 being pivotally connected with the furrowward crank. The lower end of the link 54 extends through the opening 43 of housing 41 and is pivotally connected with a locking dog 56, which is pivotally mounted at 57 upon the housing 41. The lower end of the link 55 extends through the opening 49 of housing 45 and is pivotally connected with a locking dog 58 which is pivotally mounted at 59 upon the housing 45. As shown in Figs. 1 and 5 the housings 41 and 45 extend over the peripheral portions of the locking devices so that they are well protected from weeds and trash which would be apt to wind up with the wheels and interfere with the proper engagement of the dogs 56, 58 with the ratchets. It will now be understood that if the shaft 52 is rocked the cranks 53 will actuate the links 54—55 in unison and swing the dogs 56—58 about their pivots, 57—59 and into the path of the teeth 35—40 which will simultaneously lock the ground wheels 32—37 to the arch like axle and as the plow is drawn forwardly against the ground engaging abutment formed by the locked ground wheels the frame and the plow bodies secured thereto will be elevated while the axle is rocking in the bearings 20—21. It will be noted that the rock-shaft 52 and the locking devices actuated thereby are all mounted on and swing with the axle members 29, 30, so that their relation to each other is not disturbed when the plow is leveled, as hereinafter described.

The dogs 56—58 are normally held out of the path of the teeth 35—40 by a spring 60 which is connected with an arm 61 secured to the axle 28 and to an arm 62 secured to the transverse shaft 52, the tension of the spring acting normally to rock the shaft in the direction to hold the dogs away from the teeth. When it is desired to lock the wheels to the axle to lift the plow, from the position shown in Figure 2, this is accomplished by rocking forwardly a lever 63, which is pivotally mounted at 64 upon the bearing 20, which is secured to the body supporting frame, as above described. As the lever is swung about its pivot, a lip 65 formed on the depending arm 66 of the lever engages an arm 67 secured to the transverse shaft 52 and rocks the shaft against the tension of the spring 60, the cranks thereof actuating the links 54—55 which swing the dogs 56—58 about their pivots 57—59 and into the path of the teeth as best seen in Figure 4.

As the plow is drawn forwardly and approaches its point of highest elevation by being rocked over the locked axle system, a shoulder or trip 68 formed on the arm 62 engages a fixed abutment or stop 69 carried by bracket 70 depending from the bearing 20, with the result that further lifting movement between the frame and wheel system will rock the transverse shaft 52 in the reverse direction and the cranks thereof will actuate the links 54—55 and swing the dogs 56—58 out of engagement with the teeth 35—40 as the plow reaches its point of highest elevation, thereby releasing the crank axle from its connection with the ratchet wheels. Simultaneously with the swinging of the dogs 56—58 out of engagement with the teeth 35—40, a pin 71 carried by an upwardly extending arm 72 secured to the bracket 48, has rocked into contact with a lug 73 formed on the lever 63, and has traveled along the face 74 of the lug 73 pushing the lever forwardly against the tension of spring 75 until the pin 71 passed off the face of the lug, whereupon the spring snaps the lever rearwardly, the lug dropping in behind the pin thus forming a lock or latch to hold the plow elevated, 77 indicates a pull rope secured to the lever 63 and extending forwardly to a point where it can be conveniently reached by the operator on the tractor.

The depth at which the plows operate, is controlled by lever 78. It is pivotally connected at 79 with the landward beam 10 and is provided with the usual hand operated dog latching devices that engage with a toothed rack 80 secured to the beam 10. The lever carries a stop 81 that operates in a slot 82 formed in a link 83 the latter being pivotally connected at its lower end with a stud 84 formed on the clamp member 42. We thus provide an extensible thrust connection between the landward side of the frame and the land wheel supporting portion of the crank axle, the effective length of which may readily be varied by adjusting the position of the stop 81.

Assuming the plow is in raised position as shown in Figure 3, the operator pulls the rope 77, which draws the lever 63 forwardly and rocks the lug 73 over the pin 71, whereupon the plow will drop by gravity the arch portion of the crank axle with the arm 72 swinging backward and downward, and as the plow is drawn forward the plow bodies will penetrate the soil until the shoulder formed by the lower end of the slot 82 reaches the stop 81 which stops further rocking in that direction of the axle and said arm. If it is desired to vary the plowing depth the lever 78 is shifted to adjust the stop 81 to obtain the desired result, it being understood that if the lever is raised to carry the stop higher in the slot, the suck of the plows will cause them to penetrate deeper and the axle will swing downward further before the stop is again engaged by the bottom of the slot in the link 83, while if the lever is lowered the stop 81 will be engaged by such shoulder when the crank axle has been swung downward a less distance, so that the plow bodies will not penetrate the ground so deeply.

To level the plow the lever 22 is used. By unlocking it from its rack 25 and stroking it downwardly, the frame is rocked about a longitudinal axis so that, relatively, the bearing 21 and the furrowward side of the wheel system is rocked away from the beam frame, while by stroking it upwardly the furrowward side of the wheel system and frame are brought closer together, the landward bearing 20 on the axle 28 serving as a fulcrum for the leveling adjustment. This adjustment does not affect the wheel locking devices, however, since, as above described, they are mounted on the side members of the axle. Neither does it affect the relation of the manually-operated controlling lever 63 to the rock-shaft 52 or to the pin 71, since these parts are located at the landward end of the plow where they are not moved appreciably by the movement of the furrowward side of the frame toward and from the axle incident to leveling adjustments.

When it is desired to raise the plow from the ground, assuming it to be in the position shown in Figure 2, the operator pulls the rope 77 which draws the lever 63 forwardly, the lip 65 engages the arm 67 of the transverse shaft 52 and rocks the shaft in its bearings, the crank portions 53 actuating the links 54—55 which swing the dogs 56—58 into engagement with the teeth 35—40, thus locking the ground wheels 32—37 from rotation, the wheels 34—39 being secured rigidly to the ground wheel hubs. As the plow is drawn forward with the ground wheels locked, the wheel faces engaging the soil form an abutment and as the transverse portion of the axle 28 of the locked wheel system is journaled in the bearing 20—21 of the frame, the draft force acts to rock the frame upwardly over the abutment. As the frame moves forwardly and upwardly over the locked wheel system, which is substantially stationary during the lifting operation, the stop 81 moves upwardly in the slotted link 83, the stop 69 moves into contact with the trip 68 and the transverse shaft 52 of the wheel system is rocked, its cranks 53 actuating the links 54—55 to swing the dogs 56—58 out of engagement with the teeth 35—40 and simultaneously the pin 71 has swung under the lug 73 of lever 63 thus locking the plow in elevated position with the ground wheels free to rotate upon their spindles.

85 indicates a stop carried by the bearing 20 for the lever 63 and against which the lever is normally held by the tension of spring 75. The arm 72 at its upper end is connected with a link 86 that actuates an operating lever 87 for a rear wheel support connected with the rearmost portion of the landward beam 10, the rear wheel being indicated at 88, its spindle and standard at 89, the sleeve for the standard at 90 and the supporting connection for the sleeve from the beam at 91. The rear wheel support just referred to is the subject matter of the application of Carl G. Strandlund, Serial Number 346,767, filed Dec. 22, 1919.

While the plow structure illustrated and described is a two bottom plow, the invention is not restricted to a structure having that number of plow bodies for a single plow body, or a larger number of plow bodies, may well be lifted and lowered by a locked wheel system, such as that contemplated by the present disclosure.

While the ground wheels shown in the present instance have smooth rims, they may be provided with grousers or lugs if desired.

We have found by experience that the locking of both wheels of a swinging ground abutting wheel system affords ample actuating power for self lifting plows of this type, but if desired a lifting spring of well known form can be used between the plow frame and the movable wheel system to partially balance the weight of the frame and plow bodies. However, such a spring has not been illustrated as we do not consider it essential to our invention.

We have shown and described our invention as applied to a tillage implement in which the earth working element is a plow body, but obviously the construction shown and described by which the earth working devices are lifted and supported and their position adjusted is adapted to be used in connection with earth working devices of other sorts, and the claims hereinafter made should therefore be construed accordingly.

What we claim is—

1. In a plow, the combination with a plow body carrying frame, of crank axle members at the sides of said frame, wheel spindles carried by said axle members, wheels rotatably mounted on said spindles, means carried by said axle members and associated with said wheels adapted to be actuated to lock the same non-rotatably on their respective spindles, means for rocking said frame about a longitudinal axis to level the plow, and means operable to actuate said locking means to lock or unlock said wheels in unison.

2. In a plow, the combination with a plow body carrying frame, of a unitary crank axle supporting said frame and having wheel spindles, wheels rotatably mounted on said spindles, means mounted on said axle and associated with each of said wheels adapted to be actuated to lock the same non-rotatably on its spindle, means for rocking said frame upon said axle about a longitudinal axis to level the plow, and means operable to actuate said locking means to lock or unlock said wheels in unison.

3. In a plow, the combination with a unitary axle having crank members at the sides thereof, a plow body carrying frame mounted on the axle, means operable to rock the frame about a longitudinal axis to level the plow, wheel spindles carried by said axle members, wheels rotatably mounted on said spindles, means for locking said wheels non-rotatably on their respective spindles, and means operable to actuate said locking means, comprising members mounted respectively on the frame and the axle and operating to automatically unlock said wheels when said frame has been elevated.

4. In a plow, the combination with a unitary axle having crank members at the sides thereof, a plow body carrying frame mounted on the axle, means operable to rock the frame about a longitudinal axis to level the plow, wheel spindles carried by said axle members, wheels rotatably mounted on said spindles, means for locking said wheels non-rotatably on their respective spindles, and means operable to actuate said locking means, comprising members mounted respectively on the frame and the axle and operating to automatically unlock said wheels when said frame has been elevated and to hold the frame in its elevated position.

5. In a plow, the combination with a plow body carrying frame, of a crank axle supporting said frame and having side members provided with wheel spindles, wheels rotatably mounted on said spindles, means mounted on said side members and associated with said wheels adapted to be actuated to lock the same non-rotatably on their respective spindles, lock operating means mounted on the side members of said axle and swinging therewith, and devices for actuating said lock operating means to lock or unlock said wheels in unison.

6. In a plow, the combination of a frame having a plow body fixed thereto, axle arms at the sides of the frame and connected with the frame for swinging movement, a spindle on each axle arm, a ground wheel on each spindle, a lock device carried by each axle arm adapted to engage with the adjacent ground wheel, and a single operating member mounted on said axle arms and adapted to be actuated to shift both lock devices in unison into engagement with the ground wheels.

7. In a plow, the combination of a frame having a plow body fixed thereto, axle arms at the sides of the frame and connected with the frame for swinging movement, a ground wheel on each axle arm, a lock device carried by and swinging with each axle arm adapted to engage with the adjacent ground wheel to lock it against rotation, a transverse member supported on the axle arms for connecting the lock devices for simultaneous operation, and manually operable means mounted on the frame for actuating the transverse member to lock both ground wheels against rotation.

8. In a plow the combination of a frame having a plow body fixed thereto, axle arms at the sides of the frame and connected with the frame for swinging movement, a ground wheel on each axle arm, a lock device carried by each axle arm adapted to engage with the ground wheel, a transverse member supported on the axle arms for connecting the lock devices for simultaneous operation, manually operable means mounted on the frame for actuating the transverse member to lock the wheels when the plow is lowered, and means supported by the frame and adapted to actuate the transverse member as the plow is raised to automatically unlock the wheels when the plow is raised.

9. In a plow the combination of a frame having a plow body fixed thereto, an axle comprising axle arms at the sides of the frame and connected with the frame for swinging movement, a ground wheel on each axle arm, a lock device carried by each axle arm adapted to engage with the ground wheel, a transverse member supported on the axle arms for connecting the lock devices for simultaneous operation, manually operable means mounted on the frame for holding the plow in its raised position and for actuating the transverse member to lock the wheels when the plow is lowered, means supported by the frame and adapted to actuate the transverse member as the plow is raised to automatically unlock the wheels when the plow is raised, and means carried by said axle adapted to cooperate with said manually operable means to hold the plow raised.

10. In a plow the combination of a frame having a plow body fixed thereto, an axle comprising axle arms at the sides of the frame and connected with the frame for swinging movement, a ground wheel on each axle arm, a lock device carried by each axle arm adapted to engage with the ground wheel, a transverse member supported on the axle arms for connecting the lock devices for simultaneous operation, a manually operable lever mounted between its ends on the frame and having means at one side of its pivot for actuating the transverse member to lock the wheels when the plow is lowered, and a member at the other side of its pivot for holding the plow in its raised position, means supported by the frame and adapted to actuate the transverse member as the plow is raised to automatically unlock the wheels when the plow is raised, and means carried by an axle arm adapted to cooperate with the holding member of said lever to hold the plow raised.

11. In a plow, the combination of a frame having a plow body fixed thereto, axle arms at the sides of the frame and connected with the frame for swinging movement, a ground wheel on each axle arm, a lock device carried by each axle arm adapted to engage with the adjacent ground wheel to lock it against rotation, a transverse member supported on and swinging with the axle arms and operable to actuate said lock devices in unison, manually operable means mounted on the frame for actuating the transverse member to simultaneously lock both ground wheels against rotation by means of said lock devices, and means mounted on the frame for adjusting one of said axle arms relatively to the frame to level said frame.

12. In a plow, the combination with a plow body carrying frame, of a crank axle supporting said frame and having side members provided with wheel spindles, wheels rotatably mounted on said spindles, means mounted on said side members adapted to be actuated to lock the wheels non-rotatably on their respective spindles, lock operating means mounted on the side members of said axle and swinging therewith devices mounted on the frame for actuating said lock operating means to lock or unlock said wheels in unison, and means for rocking the frame about a longitudinal axis to level the plow.

13. In a plow, the combination with a plow body carrying frame, of a crank axle supporting said frame and having side members provided with wheel spindles, wheels rotatably mounted on said spindles, means mounted on said side members adapted to be actuated to lock the wheels non-rotatably on their respective spindles, a rock-shaft mounted on said side members and having arms operatively connected with said locking means, and means adapted to be actuated to rock said rock-shaft.

14. In a plow, the combination with a plow body carrying frame, of a crank axle supporting said frame and having side members provided with wheel spindles, wheels rotatably mounted on said spindles, means mounted on said side members adapted to be actuated to lock the wheels non-rotatably on their respective spindles, a rock-shaft mounted on said side members and having arms operatively connected with said locking means so that by rocking said rock-shaft the wheels may be locked or unlocked in unison, means mounted on the frame adapted to be actuated to rock said rock-shaft, and means for rocking said frame about a longitudinal axis to level the plow.

15. In a plow, the combination with a plow body carrying frame, of a crank axle supporting said frame and having side members provided with wheel spindles, means connecting one side of said frame with said axle to permit the other side thereof to swing vertically toward or from said axle, lever mechanism for so swinging said frame and holding it in adjusted angular relation to the axle, wheels rotatably mounted on said spindles, means adapted to be actuated to lock the wheels non-rotatably on their respective spindles, and means for actuating said locking means.

16. In a plow, the combination with a plow body carrying frame, of a crank axle supporting said frame and having side members provided with wheel spindles, means connecting one side of said frame with said crank axle to permit the other side thereof to swing vertically toward or from said axle, lever mechanism for so swinging said frame and holding it in adjusted angular relation to the axle, wheels rotatably mounted on said spindles, means adapted to be actuated to lock the wheels non-rotatably on their respective spindles, lock operating means mounted on said axle members and swinging therewith, and means mounted on the frame for actuating said lock operating means.

17. In a plow, the combination with a plow body carrying frame, of a crank axle supporting said frame and having side members provided with wheel spindles, means connecting one side of said frame with said crank axle to permit the other side thereof to swing vertically toward or from said axle, lever mechanism for so swinging said frame and holding it in adjusted angular relation to the axle, wheels rotatably mounted on said spindles, means adapted to be actuated to lock the wheels non-rotatably on their respective spindles, a rock-shaft mounted on said axle members and having arms operatively connected with said locking means for actuating the same, and means mounted on the frame for rocking said rock-shaft.

18. In a plow, the combination with a plow body carrying frame, of crank axle members at the sides of said frame, wheel spindles carried by said axle members, wheels rotatably mounted on said spindles, pawl and ratchet mechanism adapted to be actuated to lock said wheels non-rotatably on their respective spindles, a rock-shaft mounted on said axle members and having arms operatively connected with said pawls for moving them into or out of engagement with the cooperating ratchets, and a lever mounted on the frame and operating when actuated in one direction to rock said rock-shaft to move said pawls into engagement with said ratchets.

19. In a plow, the combination with a plow body carrying frame, of crank axle members at the sides of said frame, wheel spindles carried by said axle members, wheels rotatably mounted on said spindles, pawl and ratchet mechanism adapted to be actuated to lock said wheels non-rotatably on their respective spindles, a rock-shaft mounted on said axle members and having arms operatively connected with said pawls for moving them into or out of engagement with the cooperating ratchets, a lever mounted on the frame and operating when actuated in one direction to rock said rock-shaft to move said pawls into engagement with said ratchets, means for automatically disconnecting said pawl and ratchet mechanism when the frame has been elevated to a predetermined position, and means carried by said lever for holding the frame in its elevated position.

20. In a plow, the combination with a plow body carrying frame, of crank axle members at the sides of said frame, wheel spindles carried by said axle members, wheels rotatably mounted on said spindles, means adapted to be actuated to lock the wheels non-rotatably on their respective spindles, a rock-shaft mounted on said axle members and operatively connected with said locking means for moving the same into or out of operative position by the rocking of said rock-shaft, a spring for normally holding said locking means in inoperative position, a lever mounted on the frame and operable to rock said rock-shaft to move said locking means into operative position, means for releasing said locking means when the frame is elevated to a predetermined position, and means cooperating with said lever to lock the frame in its elevated position.

21. In a plow, the combination with a plow body carrying frame, of crank axle members at the sides of said frame, wheel spindles carried by said axle members, wheels rotatably mounted on said spindles, means adapted to be actuated to lock the wheels non-rotatably on their respective spindles, means operable to actuate said locking means, and housing members at the inner ends of the wheel spindles and extending over the inner and peripheral portions of said locking means.

22. In a plow, the combination of a frame having a plow body fixed thereto, axle arms at the sides of the frame and connected with the frame for swinging movement, a ground wheel on each axle arm, a lock device carried by and swinging with each axle arm adapted to engage with the adjacent ground wheel to lock it against rotation, a transverse member supported on and swinging with the axle arms and operable to control the operation of said lock devices, and manually operable means for actuating said transverse member to lock both ground wheels against rotation.

THEOPHILUS BROWN.
CARL G. STRANDLUND.

CERTIFICATE OF CORRECTION.

Patent No. 1,610,253. granted December 14, 1926.

to THEOPHILUS BROWN ET AL.

It is hereby certified that error appears in the printed specification of the above mentioned patent requiring correction as follows: Page 2, line 10, after the word "pivots" strike out the comma; page 4, line 116, claim 10, strike out the words "an axle arm" and insert instead "said axle"; page 5, line 16, claim 12, after the word "therewith" insert a comma; and that the said Letters Patent should be read with these corrections therein that the same may conform to the record of the case in the Patent Office.

Signed and sealed this 8th day of March, A. D. 1927.

Seal.

M. J. Moore,
Acting Commissioner of Patents.